United States Patent [19]

Invernizzi

[11] Patent Number: 4,480,146
[45] Date of Patent: Oct. 30, 1984

[54] LIGHTNING PROTECTOR ASSEMBLY

[75] Inventor: Cesare G. Invernizzi, Geneva, Switzerland

[73] Assignee: Energie Froide International SA, Geneva, Switzerland

[21] Appl. No.: 497,886

[22] Filed: May 25, 1983

[30] Foreign Application Priority Data

Jun. 3, 1982 [CH] Switzerland ............... 3423/82

[51] Int. Cl.³ .................. H02G 13/00; H01T 1/00
[52] U.S. Cl. ........................... 174/3; 174/4 R; 361/137
[58] Field of Search ............ 174/2, 3, 4 R, 4 C; 313/325; 361/117, 132, 137, 138

[56] References Cited

FOREIGN PATENT DOCUMENTS 1089440 9/1960 Fed. Rep. of Germany ..... 174/4 R

*Primary Examiner*—Laramie E. Askin
*Attorney, Agent, or Firm*—Ladas & Parry

[57] ABSTRACT

An electrically conductive device (6) is positioned in the vicinity of a lightning rod point (1, 2), where it is electrically isolated from the lightning rod (1) and the ground conductor (3). This device (6) comprises a first component (7) extending radially from the lightning rod (1) and having terminal spikes (8, 9, 10) for facilitating the adjustment of said component to the potential of the surrounding atmosphere. The device (6) also comprises a second component (11) terminated by an electrode (12), which is positioned at a sufficiently short distance from the lightning rod (1) and in such a manner that a discharge takes place between the electrode (12) and the lightning rod (1) as a result of the voltage developing across the gap between said conductive device (6) and the lightning rod (1).

The advantage of the system is that the efficiency of the lightning protector is greatly improved by comparison with lightning protectors provided with a radio-active source, while operating without such a source.

3 Claims, 1 Drawing Figure

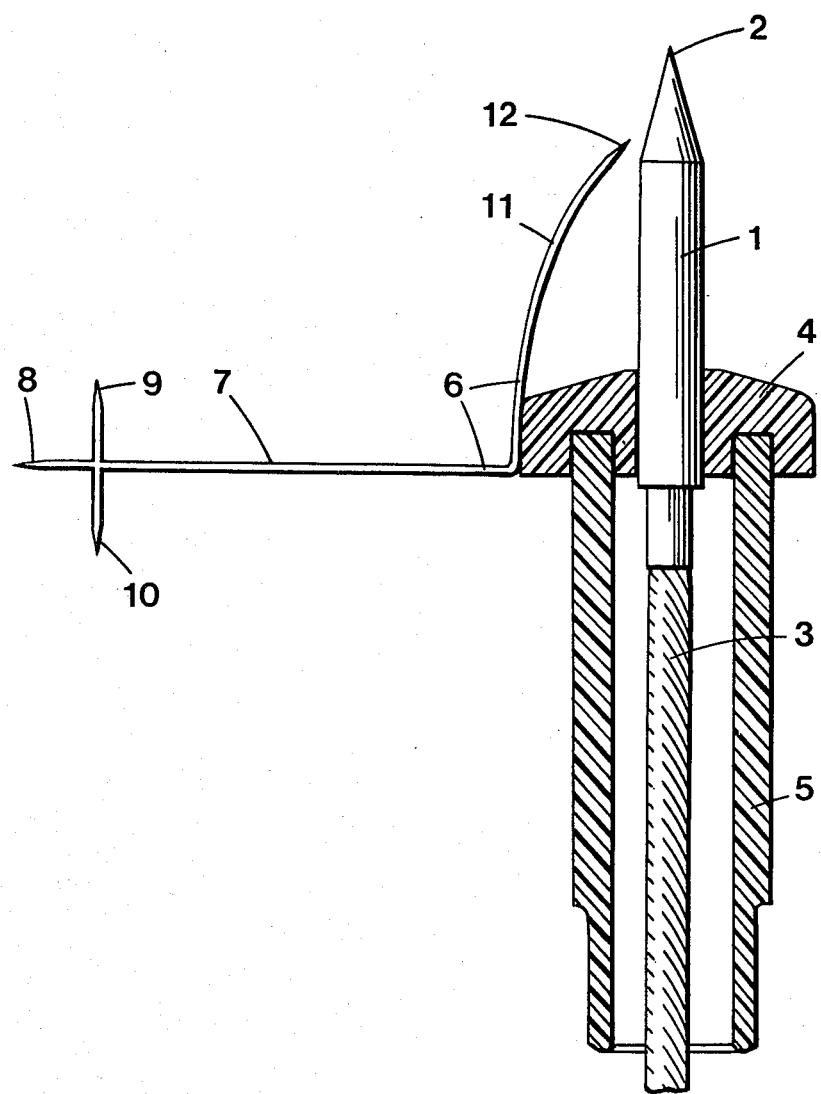

LIGHTNING PROTECTOR ASSEMBLY

Various types of lightning protectors have been developed which are provided with a radio-active source to facilitate the arrival of the strokes to the lightning rod point.

It has been experimentally established, that a radioactive source, positioned in the vicinity of the lightning rod point improves protection against lightning, i.e. facilitates the arrival of the strokes to the lightning rod point as a result of the ionization which takes place in the vicinity of the lightning rod point. In stormy weather, this ionization strongly contributes to the formation of a preferential conductive channel between the electrified cloud and the lightning rod point: the lightning will fall from the cloud on the lightning rod instead of striking in the surrounding area.

The use of an electric field to act upon the radioactive particles emitted by such radio-active sources associated with lightning protectors to improve their efficiency by increasing the distance at which the air is ionized has been disclosed in a number of patents (see for example U.S. Pat. Nos. 2,025,338 and 2,644,026, Italian Pat. No. 610.061, Austrian Pat. No. 177.178 and UK Pat. No. 429.004).

However nowadays, the use of radio-active sources in association with lightning rods is meeting an increasing opposition from both authorities and users, because of their danger. In most countries, the use of radio-active substances for lightning protectors has already been purely and simply prohibited.

The author of the present invention has made by experimenting the finding, which at first sight is surprising, that radio-active sources can be dispensed with, and that a considerably improved protection against lightning strokes—which would be otherwise impossible to obtain with radio-active sources—is achieved if an ionization is produced in the vicinity of the lightning rod point by the discharge of one or several electric arcs.

The appended drawing illustrates, by way of example, an embodiment of this invention. This single FIGURE is a cross-sectional view of the upper portion of this embodiment.

The FIGURE shows a lightning rod 1, the point 2 of which is designed to receive the lightning strokes. This rod is connected to the upper end of a conductor 3, the lower end of which is connected to the ground in accordance with the normal practices. The rod 1 is held by usual means—not illustrated—in a coaxial insulator 4. This insulator 4 is fastened to a tube 5, which holds the assembly by known means—not illustrated—at the top of a building, a watercraft or a structure (such as a radio or television transmitting station) to be protected against lightning. The different components described above are all well known in the art. The part which is new and original consists of a metal device 6 fastened by known means—not illustrated—to the insulator 4 in such a manner as to be well isolated electrically from both the rod 1 and the ground conductor 3. The device 6 comprises a first arm 7, which acts as an electric probe and extends radially from the insulator 4 to a distance which can be, for example of 10 to 20 cm, or more. The free end of the arm 7 is provided in this embodiment with three sharp spikes 8, 9 and 10. The arm 7 with its spikes 8, 9, 10 acts to adjust the electric potential of the device 6 to the electric potential of the surrounding atmosphere.

The device 6 also comprises a second arm 11, the free end 12 of which is pointed and positioned in a close relationship with the lightning rod point 2. This free end 12 acts as an electrode, as shall be seen further.

In another embodiment, a plurality of devices such as 6 are positioned on the insulator 4, so as to extend radially therefrom. In yet another embodiment, the spikes 9 and 10 of component 7 are deleted, with only spike 8 remaining.

The device functions as follows:

It is well known that in stormy weather, the potential in the atmosphere increases from the ground upwards. The potential gradient can reach thousands, if not tens of thousands of volts per meter in elevation. The component 7 of device 6 acts to bring this device to the same potential as the surrounding atmosphere. The spikes 8, 9 and 10 function to speed up by the well known effect sharp points have the adjustment of the potential of the device 6 to that of the surrounding atmosphere.

In stormy weather, the voltage which appears across the gap between the sharp end 12 (which is at the same potential as the surrounding atmosphere) and the rod 1 increases to a level where an electric discharge takes place between 12 and 1. This discharge results in bringing momentarily the potential of the component 7 to zero, whereby the discharge is interrupted. The potential of the device 6 increases again to the same potential as the surrounding atmosphere, and a new discharge occurs between 7 and 1. In stormy weather, the successive discharges will recur at a high frequency, and the system will substantially behave as if the discharge were of a continuous nature. As confirmed experimentally, this electric discharge creates in the atmosphere above the point 2 a conductive channel, which the lightning will preferably follow to reach the point 2 and pass the stroke to the ground through the ground conductor 3.

Accordingly, the lightning protector assembly which is the object of the present invention operates without a radio-active source, while offering the outstanding advantages of the lightning protectors provided with a powerful radio-active source. Furthermore, the efficiency of the new system increases with the intensity of the discharge occurring between 12 and 1, i.e. with the magnitude of the potential gradient in the surrounding air: the efficiency therefore increases as better protection from lightning is needed.

There is obviously a distinct advantage from the standpoint of safety to use instead of a bare ground conductor as 3, a conductor with a sheath, where the metal sheath is electrically isolated from the ground conductor and connected to the ground as the ground connector is. The Swiss Pat. No. 521.677 and the corresponding patents granted in other countries (particularly the U.S. Pat. No. 3,919,956 and the German Pat. No. 2.212.158) describe such an improved ground conductor for preventing secondary electric discharges from occurring, the danger of which is well established.

A system such as described can be used to protect not only buildings, watercraft and telecommunication stations, but also to protect high tension lines provided or not with protective conductors (wires or cables) electrically connected at each tower to the lower end of a lightning rod, which is connected to the ground preferably by a cable with a sheath.

What I claim is:

1. A lightning protector assembly, characterized in that it comprises at least one electrically conductive device (6) positioned in the vicinity of a lightning rod point (1, 2) and electrically isolated from both this point (1, 2) and a conductor (3) connecting the lightning rod point to the ground, said device (6) comprising a first component (7) terminated by at least one spike (8, 9, 10) for facilitating the adjustment of the device (6) to the electric potential of the atmosphere, and a second component (11) extending as an electrode (12) positioned at a sufficiently short distance from the lightning rod point (1), so that, at least in the event of stormy weather, an electric discharge takes place between the electrode (12) and the lightning rod point (1) as a result of the voltage developed across the gap between said conductive device (6) and the lightning rod point (1), such a discharge being sufficient by itself to improve the efficiency of the lightning protector.

2. An assembly according to claim 1, characterized in that said first component (7) of the conductive device (6) extends in a generally radial direction from the lightning rod point (1).

3. An assembly according to claim 1, characterized in that the second component (11) extending as an electrode (12) is also terminated at the end adjacent to the lightning rod point by a spike to facilitate the electric discharge between the electrode and the lightning rod point.

* * * * *